United States Patent
Goto et al.

(10) Patent No.: US 8,305,003 B2
(45) Date of Patent: Nov. 6, 2012

(54) MERCURY LAMP AND MERCURY LAMP LIGHTING APPARATUS

(75) Inventors: Kazuhiro Goto, Hyogo (JP); Takashi Yamashita, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 195 days.

(21) Appl. No.: 12/801,763

(22) Filed: Jun. 24, 2010

(65) Prior Publication Data

US 2011/0025218 A1   Feb. 3, 2011

(30) Foreign Application Priority Data

Jul. 31, 2009   (JP) .................................. 2009-179353

(51) Int. Cl.
*H05B 37/02* (2006.01)
(52) U.S. Cl. ...................... 315/246; 315/56; 315/DIG. 2
(58) Field of Classification Search .................. 315/246, 315/59, 58, 247, 251, 291, 307, 308, DIG. 2, 315/DIG. 5, 56; 313/623, 624, 625
See application file for complete search history.

(56) References Cited

U.S. PATENT DOCUMENTS

| | | | | |
|---|---|---|---|---|
| 6,670,780 | B2 * | 12/2003 | Ono et al. ...................... | 315/291 |
| 7,075,232 | B2 * | 7/2006 | Maseki et al. ................ | 313/512 |
| 7,170,237 | B2 * | 1/2007 | Suzuki et al. ................. | 315/246 |
| 2003/0155864 | A1 | 8/2003 | Wada et al. | |
| 2005/0206326 | A1 | 9/2005 | Suzuki et al. | |
| 2006/0055329 | A1 | 3/2006 | Yamashita et al. | |
| 2010/0188855 | A1 | 7/2010 | Sakaguchi et al. | |

FOREIGN PATENT DOCUMENTS

| | | |
|---|---|---|
| JP | 2000-231903 A | 8/2000 |
| JP | 2005-063817 A | 3/2005 |
| JP | 2006-059790 A | 3/2006 |
| JP | 2006-079986 A | 3/2006 |
| JP | 2007-280823 A | 10/2007 |
| JP | 2008-071718 A | 3/2008 |
| WO | WO-2009/011117 A1 | 1/2009 |

* cited by examiner

*Primary Examiner* — David Hung Vu
(74) *Attorney, Agent, or Firm* — Rader, Fishman & Grauer PLLC

(57) ABSTRACT

In an ultrahigh pressure mercury lamp that encloses mercury is enclosed in an arc tube, an electrode has a head portion whose diameter is larger than that of an axis portion and a cylindrical portion formed to project from and extend, integrally with a back end face of the head portion, wherein an inner circumference face the cylindrical portion is apart from the axis portion so as to surround the axis portion. During an alternating current lighting, a relational expression of $d/(1/f) \times 1/2 \geq 3.8$ is satisfied, wherein a frequency, which relates to an anode operation period that is the longest in the anode operation period during which one electrode serves as an anode, is represented as f, and a distance in an axial direction from the leading edge position of the head portion of the electrode to a boundary position between the head portion and the cylindrical portion is represented as d.

2 Claims, 4 Drawing Sheets

MERCURY LAMP AND MERCURY LAMP LIGHTING APPARATUS

CROSS-REFERENCES TO RELATED APPLICATION

This application claims priority from Japanese Patent Application Serial No. 2009-179353 filed Jul. 31, 2009, the contents of which are incorporated herein by reference in their entirety.

TECHNICAL FIELD

The present invention relates to a short arc type ultrahigh pressure mercury lamp, and more particularly, relates to an ultrahigh pressure mercury lamp and an ultrahigh pressure mercury lamp lighting apparatus suitable as a back light of a projection type projector apparatus, such as a DLP (digital light processing (Trademark)) that uses a DMD (Digital Micromirror Device (Trademark)).

BACKGROUND

For example, in such a projection type projector apparatus, such as DLP (Digital Light Processing: Registered Trademark) that uses a DMD (Digital Micromirror Device (Registered Trademark)), an image with uniform and sufficient color rendering properties is projected onto a rectangle screen.

For this reason, the short arc type ultrahigh pressure mercury lamp, in which the mercury vapor pressure at the time of lighting turns into 150 or more atmospheric pressure, is adopted as a light source. Moreover, in a lamp that is used for an ultraviolet rays exposure or for lighting of an optical apparatus, a short arc type ultrahigh pressure mercury lamp, in which the mercury vapor pressure thereof at time of lighting turns into 100 or more atmospheric pressure, is adopted. A pair of electrodes is arranged so as to face each other at an interval of, for example, 2 mm or less in the arc tube of the ultrahigh pressure mercury lamp. The arc tube is made of, for example, silica glass, and mercury and halogen are enclosed in the arc tube. The main purpose of enclosing halogen in the arc tube is to form a halogen cycle in the arc tube and to suppress adherence of tungsten, which is electrode material, onto an inner wall of the arc tube. For example, Japanese Patent Application Publication Nos. 2005-063817, 2006-079986, 2000-231903 teach such an ultrahigh pressure mercury lamp, respectively.

FIG. 7 is an explanatory cross sectional view of the structure of the main part of an example of a conventional ultrahigh pressure mercury lamp. This ultrahigh pressure mercury lamp 80 is an alternating current lighting type system, in which lighting is carried out by impressing alternating current voltage. The ultrahigh pressure mercury lamp 80 has an arc tube 100 made of silica glass, wherein rod-like sealing portions 102 are formed at both ends of a light emission section 101. A pair of electrodes 90, which are respectively made of tungsten, is arranged so as to face each other in the light emission section 101 of the arc tube 100. Each of the electrodes 90 has a rod shape axis portion 91 whose base end portion is buried in and held by the sealing portion 102 of the arc tube 100. An approximately conic head portion 92 is integrally formed at the tip of each axis portion 91 through an approximately cylindrical body portion 93. A projection portion 92A is formed at the tip of this head portion 92. A conductive metallic foil (not shown in the figure) buried in each sealing portion 102 of the arc tube 100 is welded and connected to the base end portion of the axis portion 91 of the electrode 90. An external lead rod (not shown in the figure), which projects from an outer end of each sealing portion 102 of the arc tube 100, is connected to this conductive metallic foil. Moreover, in the example shown in the figure, a coil portion 94 is integrally formed on the circumference of each body portion 93 by melting a coil winded around the body portion 93. The coil portion 94 mainly heats the electrode 90 so as to help a temperature rise of the electrode 90 during a glow discharge period at lamp start-up time, thereby making easy transition from the glow discharge to arc discharge.

In such an ultrahigh pressure mercury lamp 80, there is a problem that a projection is formed at the tip of the electrode 90 during lighting, so that a flicker occurs. As a means for solving such a problem, there has been a unit for inserting intermittently alternating current of frequency lower than regular lighting frequency, in alternating current of regular lighting frequency, so as to supply it to the ultrahigh pressure mercury lamp from a power supply apparatus (refer to Japanese Patent Application Publication No. 2006-59790).

SUMMARY

However, there are problems in the ultrahigh pressure mercury lamp 80. That is, in a period when the alternating current of frequency lower than the regular lighting frequency is supplied to the ultrahigh pressure mercury lamp 80, the tip of the electrode 90, which is serving as an anode, is heated to temperature higher than that in a period when the alternating current of regular lighting frequency is supplied. Since the electrode 90 is deformed when the heat produced at the tip of this electrode 90 is transmitted to other portions of the electrode 90, thereby causing an overheating state, there is a problem that illumination thereof decreases as lighting time advances.

The present invention is made in view of the above situations, and it is an object of the present invention to offer an ultrahigh pressure mercury lamp and an ultrahigh pressure mercury lamp lighting apparatus in which deformation of an electrode is suppressed and a high illuminance maintenance rate thereof can be obtained, even though it is lit for a long time.

In an ultrahigh pressure mercury lamp according to the present invention, an arc tube that is made of silica glass and that has a light emission section and sealing portions continuously formed from both ends of the light emission section encloses mercury. In the arc tube, a pair of electrodes, each of which has a rod shape axis portion whose base end portion is buried and held in the sealing portion, is arranged to face each other. The electrode has a head portion whose diameter is larger than that of the axis portion and a cylindrical portion formed to project from and extend, integrally with a back end face of the head portion, so that an inner circumference face thereof is apart from the axis portion so as to surround the axis portion. In the ultrahigh pressure mercury lamp, during alternating current lighting, a relational expression of $d/(1/f)^{1/2} \geq 3.8$ is satisfied, wherein frequency relating to an anode operation period which is the longest in the anode operation period during which one electrode serves as an anode, is represented as f (Hz), and wherein a distance in an axial direction from the leading edge position of the head portion of the electrode to a boundary position between the head portion and the cylindrical portion is represented as d (mm).

Moreover, an ultrahigh pressure mercury lamp lighting apparatus according to the present invention comprises the above mentioned ultrahigh pressure mercury lamp and a power supply apparatus that supplies alternating current to the ultrahigh pressure mercury lamp, wherein while the power supply apparatus supplies the alternating current of regular lighting frequency, it supplies alternating current in which alternating current of frequency lower than the regular lighting frequency is inserted intermittently in the alternating current of the regular lighting frequency.

In the ultrahigh pressure mercury lamp and the ultrahigh pressure mercury lamp lighting apparatus according to the present invention, even when the lamp is lit for a long time, if the relational expression is satisfied, deformation of the electrode can be suppressed and a high illuminance maintenance rate thereof can be obtained.

BRIEF DESCRIPTION OF DRAWINGS

Other features and advantages of the present ultrahigh pressure mercury lamp and ultrahigh pressure mercury lamp lighting apparatus will be apparent from the ensuing description, taken in conjunction with the accompanying drawings, in which.

DESCRIPTION

Figure 1:
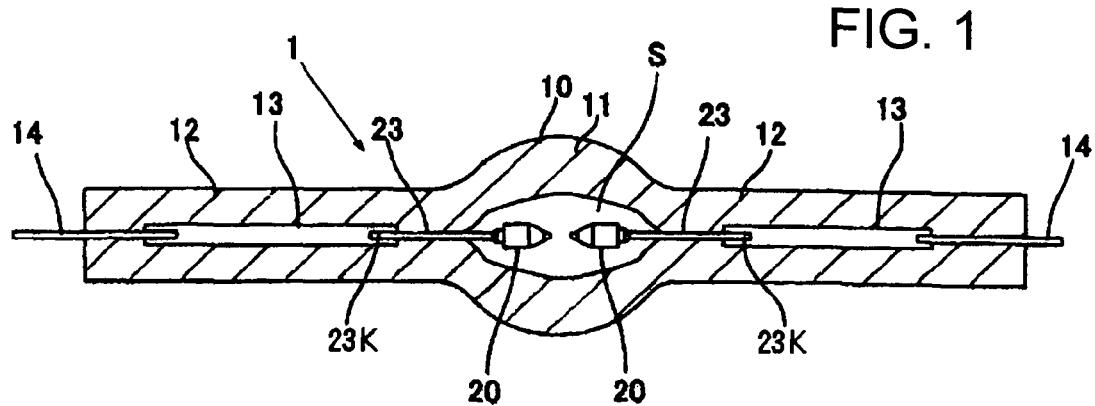
FIG. 1 is an explanatory cross sectional view of the structure of an ultrahigh pressure mercury lamp according to the present invention.
Figure 2:
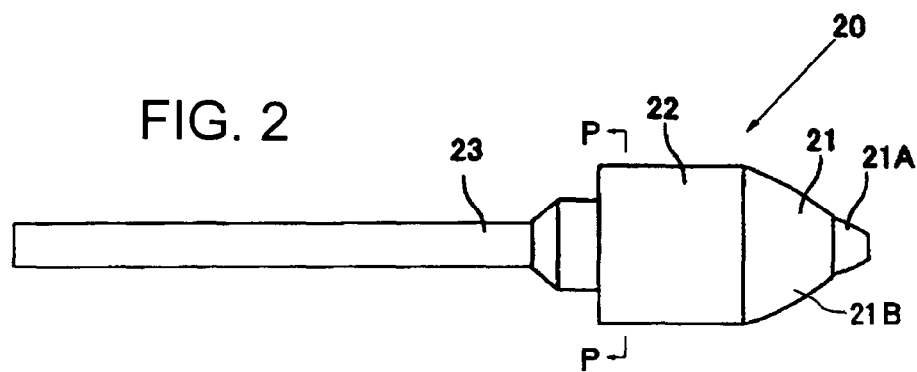
FIG. 2 is a side view of an electrode of an ultrahigh pressure mercury lamp shown in FIG. 1.
Figure 3:
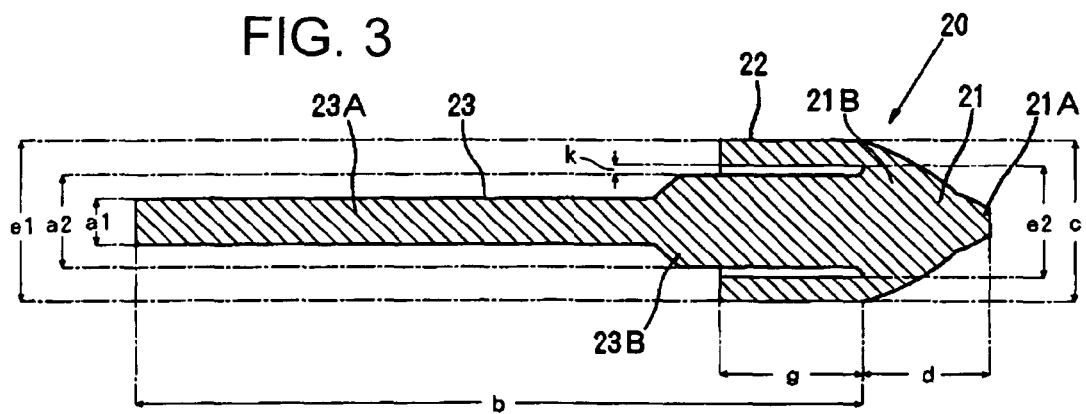
FIG. 3 is a side cross sectional view of an electrode shown in FIG. 2.
Figure 4:
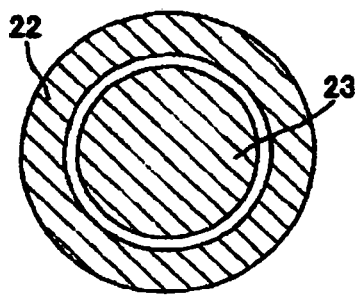
FIG. 4 is a cross sectional view of the electrode shown in FIG. 2, taken along a line P-P.

Detailed description of embodiments according to the present invention will be given below, referring to drawings. FIG. 1 is an explanatory cross sectional view of the structure of an example of an ultrahigh pressure mercury lamp according to the present invention. FIG. 2 is a side view of an electrode of the ultrahigh pressure mercury lamp shown in FIG. 1. FIG. 3 is a side cross sectional view of the electrode shown in FIG. 2. FIG. 4 is a cross sectional view of the electrode shown in FIG. 2, taken along a line P-P of FIG. 2. An arc tube 10 of this ultrahigh pressure mercury lamp 1 includes a light emission section 11 whose outer shape is approximately spherical, in which an electrical discharge space S is formed, and rod shape sealing portions 12, which are respectively formed continuously from and integrally with both ends of the light emission section 11, and which extend outward along with a tube axis. In the light emission section 11 of the arc tube 10, a pair of electrodes 20, which are made of tungsten in their entireties, is arranged to face each other, each of which has a rod shape axis portion 23 whose base end portion is buried and held in the sealing portion 12. In each sealing portion 12 of the arc tube 10, a metallic foil 13 made of molybdenum is airtightly buried by shrink sealing. A base end 23K of the axis portion 23 of each of the pair of electrodes 20 is welded to one end of each metallic foil 13, to electrically connect the electrode and foil. On the other hand, an external lead 14, which projects outward from an outer end of the sealing portion 12, is welded to the other end of each metallic foil 13, to electrically connect the lead and outer end. The ultrahigh pressure mercury lamp 1 in this example is configured for an alternating current lighting system that is driven and lit by impressing an alternating current voltage between the pair of electrodes 20, wherein the electrodes 20 have the same structure as each other to make a thermal design for time of regular lighting easy.

The arc tube 10 is made of silica glass, and encloses mercury, rare gas, and halogen gas in the light emission section 11. The mercury is enclosed in the light emission section 11, to obtain radiation light with a required visible light wavelength of, for example, 360-780 nm. To secure the high mercury vapor pressure of, for example, 100 or more atmospheric pressure at time of lighting, the amount of mercury enclosed therein is 0.10 mg/mm$^3$. More preferably, to secure the high mercury vapor pressure of 150 or more atmospheric pressure, the amount of mercury enclosed therein is 0.15 mg/mm$^3$. By increasing the enclosed amount of the mercury, the high mercury vapor pressure of 200 or more atmospheric pressure or 300 atmospheric pressure or more can be obtained at time of lighting, whereby the light source suitable for a projector apparatus can be realized. The rare gas is enclosed in the light emission section 11 to improve the lighting starting nature, and the enclosure pressure is 10-26 kPa in static pressure. Moreover, argon gas can be suitably used as the rare gas. The halogen enclosed in the light emission section 11 forms a halogen cycle in the light emission section 11. In addition, the halogen is used to suppress the tungsten, which is the electrode material, from adhering to an inner wall of the light emission section 11, and is enclosed in form of a compound thereof with metal such as mercury and other metals. The enclosed amount of halogen is $1 \times 10^{-6}$–$1 \times 10^{-2}$ μmol/mm$^3$. Moreover, iodine, bromine, chlorine, etc. can be used as halogen. Moreover, in the light emission section 11, metal halide can also be enclosed as another discharge medium.

The axis portion 23 of the electrode 20 has a smaller diameter portion 23A and a larger diameter portion 23B, which is integrally formed at the tip of the smaller diameter portion 23A, and a head portion 21 is integrally formed at the tip of the larger diameter portion 23B of the axis portion 23. This head portion 21 has a base portion 21B of an approximately circular truncated cone shape whose diameter is smaller toward the tip thereof, and a projection portion 21A of an approximately circular truncated cone shape whose diameter is smaller toward the tip thereof, wherein the projection portion 21A is integrally formed with the base portion 21B. A back end of the base portion 21B of the head portion 21 has a diameter larger than that at the tip of the larger diameter portion 23B of the axis portion 23. A back end of the projection portion 21A of a head portion 21 has a diameter smaller than that at the tip of the base portion 21B. The cylindrical portion 22 that has substantially the same outer diameter as that of the back end of the base portion 21B is integrally formed, continuously from the back end of the base portion 21B of the head portion 21 to surround the axis portion 23, in a state where the cylindrical portion 22 is separated from the axis portion 23. It is desirable that tungsten whose purity is 4N or more be used to form the electrodes 20. When the tungsten whose purity is 4N or more is used for electrode material, it is possible to reduce the quantity of impurities emitted into the electrical discharge space S from the head portion 21 or the axis portion 23 of the electrodes 20. Moreover, the electrode 20 may be formed by, for example, cutting a rod shape material made of tungsten by a laser beam processing, by an electrical discharge processing, or by welding electrode parts that are separately formed in advance.

The volume of the head portion 21 is preferably 2.5-6 mm³. When the volume of the head portion is too small, the heat capacity thereof is small, so that the electrode material tends to melt or evaporate due to the thermal load caused by an arc. On the other hand, when the volume of the head portion 21 is too large, the amount of the light blocked by the head portion 21 is large, so that it may become difficult to efficiently emit light to the outside. Moreover, the diameter of the back end of the head portion 21 (the diameter of the back end of the base portion 21B in the example shown in the figure) is, for example, 1.4-1.8 mm.

The full length of the cylindrical portion 22 is preferably 0.3-5 mm. In case the full length of the cylindrical portion 22 is too short, when electric discharge reaches the axis portion 23, the axis portion 23 may be heated to high temperature, and the heat generated in the cylindrical portion 22 tends to be conducted to the axis portion 23 through the head portion 21. On the other hand, in case the full length of the cylindrical portion 22 is too long, since the distance between the cylindrical portion 22 and an inner wall of the arc tube 10 becomes short, when electric discharge occurs in the back end portion of the cylindrical portion 22, blackening may occur on the arc tube 10.

Although the diameter of the axis portion 23 is determined by taking into consideration the rated power consumption of the lamp, and the thermal expansion difference between the electrode substance that forms the electrode 20 and silica glass that forms the sealing portion 12, etc. the diameter at the tip of the axis portion 23 (the diameter at the tip of the larger diameter portion 23B in the example shown in the figure) is desirably 20-70% of the diameter of the back end of the head portion 21. When the diameter at the tip of the axis portion 23 is in this range, since the heat transfer from the head portion 21 to the axis portion 23 is small, it is possible to suppress an increase in heat of the axis portion 23. Moreover, in the example shown in the figure, since the larger diameter portion 23B is formed at the tip side of the axis portion 23, when the electrode 20 is manufactured by cutting a rod shape material by a laser beam processing, electrical discharge processing, etc., a portion to be removed from the rod shape material is small, so the electrode 20 is easy to manufacture.

The distance k between the cylindrical portion 22 and the axis portion 23 of the electrode 21 is desirably 10 μm (micrometers)-1 mm. In the case where the distance k is 10 μm or more, even when the cylindrical portion 22 is heated so as to become a high temperature state at start-up time of the ultrahigh pressure mercury lamp 1, since that heat is hard to be directly conducted to the axis portion 23, it is possible to suppress the temperature increase of the axis portion 23.

In the ultrahigh pressure mercury lamp 1 according to the present invention, a relational expression of $d/(1/f)^{1/2} \geq 3.8$ is satisfied during alternating current lighting, wherein a frequency relating to an anode operation period that is the longest in the anode operation period during which one electrode is serving as an anode is represented as f (Hz), and wherein a distance in an axial direction (which is also referred to as the "full length of the head portion") from the leading edge position of the head portion of the electrode 20 to a boundary between the head portion 21 and the cylindrical portion 22 is represented as d (mm).

In the ultrahigh pressure mercury lamp 1 in an operation of alternating current lighting, the temperature increases in an anode operation period during which the electrode 20 is serving as an anode. That is, the longest period in the anode operation period is a period in which a high heat load is supplied to the electrode 20, which is serving as an anode, wherein it is determined by the reciprocal of that frequency.

Generally, when heat given in alternating current diffuses inside a substance, it is known that how much heat remains therein depends on the thermal diffusion rate of the substance and the square root of a half wave period of the alternating current. The above-mentioned relational expression is experimentally acquired from such a viewpoint, and when a value of the relation of $d/(1/f)^{1/2}$ is 3.8 or more, since the heat generated in the tip of the head portion 21 of the electrode 20 is suppressed so as not to be conducted to the back end position of the head portion 21, it is possible to prevent the electrode 20 from deforming at an early stage. Therefore, in the ultrahigh pressure mercury lamp 1 according to the present invention, even when the lamp is lit for a long time, deformation of the electrode 20 is suppressed to obtain a high illuminance maintenance rate.

Therefore, in the ultrahigh pressure mercury lamp 1 according to the present invention, the value of $d/(1/f)^{1/2}$ is desirably 316 or less ($d/(1/f)^{1/2} \leq 316$). In the ultrahigh pressure mercury lamp 1, when the frequency of the alternating current supplied thereto exceeds 1,000 Hz, a projection having a stable shape is hard to form at the tip of the electrode 20 so that a flicker tends to occur. Moreover, since the ultrahigh pressure mercury lamp 1 is used as a light source of, for example, a projector apparatus, high intensity is required therefore, thus bulb wall loading needs to be extremely high and the lamp needs to be small in size, wherein the maximum diameter of the light emission section 11 of the arc tube 10 is 20 mm or less. In the electrode 20 arranged in such an arc tube 10, the full length of the head portion 21 is half the maximum diameter of the light emission section 11 of the arc tube 10, i.e., 10 mm or less. Therefore, when the maximum frequency of the alternating current supplied thereto is 1,000 Hz and the maximum full length of the head portion 21 is set to 10 mm, the value of $d/(1/f)^{1/2}$ becomes 316 or less.

The specification of the electrode 20 of the ultrahigh pressure mercury lamp 1 will be given below. The diameter a1 of the smaller diameter portion of the axis portion 23 is 0.4 mm, and the diameter a2 of the larger diameter portion is 0.77 mm. The full length b of the axis portion 23 is 6.8 mm, and the diameter c of the back end (the back end of the base portion 21B in the example shown the figure) of the head portion 21 is 1.6 mm. The full length d of the head portion 21 is 1.2 mm, the outer diameter e1 of the cylindrical portion 22 is 1.6 mm, the inner diameter e2 of the cylindrical portion 22 is 1.15 mm, the full length g of the cylindrical portion 22 is 1.2 mm, and the distance k between the cylindrical portion 22 and the axis portion 23 is 0.19 mm.

Figure 5:
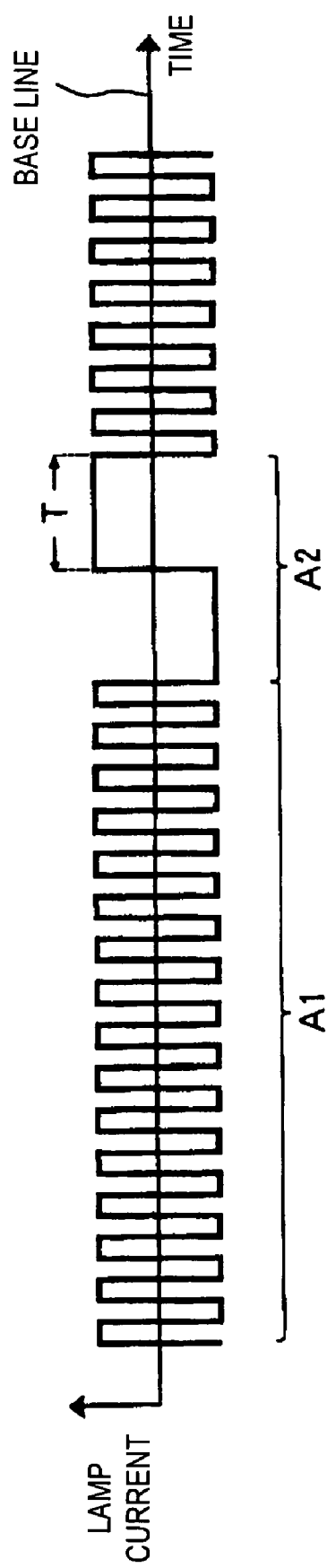
FIG. 5 is an explanatory diagram showing an example of a waveform of alternating current supplied to an ultrahigh pressure mercury lamp from a power supply apparatus.

When the ultrahigh pressure mercury lamp according to the present invention is lit by a lighting apparatus, in which while, for example, the alternating current of regular lighting frequency is supplied thereto from a power supply apparatus, the alternating current of a frequency lower than the regular lighting frequency is intermittently inserted in the alternating current of the regular lighting frequency so that it is supplied to the lamp. FIG. 5 is an explanatory diagram showing an example of a waveform of the alternating current supplied to the ultrahigh pressure mercury lamp from the power supply apparatus. A vertical axis thereof shows lamp current, and a horizontal axis shows time. When the lamp current is larger than that of a baseline in this figure, it is an anode operation period when one electrode is serving as an anode (while the other electrode is serving as a cathode). When the lamp current value is lower than the baseline, it is a cathode operation period when the one electrode is serving as a cathode (while the other electrode is serving as an anode). This alternating current consists of the alternating current A1 of the regular lighting frequency and the alternating current A2 of the frequency lower than the alternating current A1, which is intermittently inserted in the alternating current A1 of the regular lighting frequency. The frequency of the alternating current A1 of the regular lighting frequency is selected from the range of 90-450 Hz. The frequency of the alternating current A2 is lower than that of the alternating current A1, and, for example, is selected from the range of 10-150 Hz. Moreover, one time supply period of the alternating current A1, that is, a time interval during which the alternating current A2 is inserted, is, for example, approximately 0.1 second. Moreover, the one time supply period of the alternating current A2 is, for example, approximately 0.006-0.1 seconds. In such an alternating current, since the anode operation period T of one electrode according to the alternating current A2 is the longest in the anode operation period of the one electrode, the frequency according to the anode operation period T turns into the frequency f in the above-mentioned relational expression. Moreover, in the ultrahigh pressure mercury lamp lighting apparatus, which has the power supply apparatus for supplying alternating current, it is possible to suppress flicker generation.

When the present invention is applied to a short arc type ultrahigh pressure mercury lamp, in which mercury of 0.10 mg/mm$^3$ or more is enclosed in an arc tube, it is very useful as a lamp for ultraviolet rays exposure or a lamp for lighting in an optical apparatus, in addition to a light source of a projection type projector apparatus.

Figure 6:
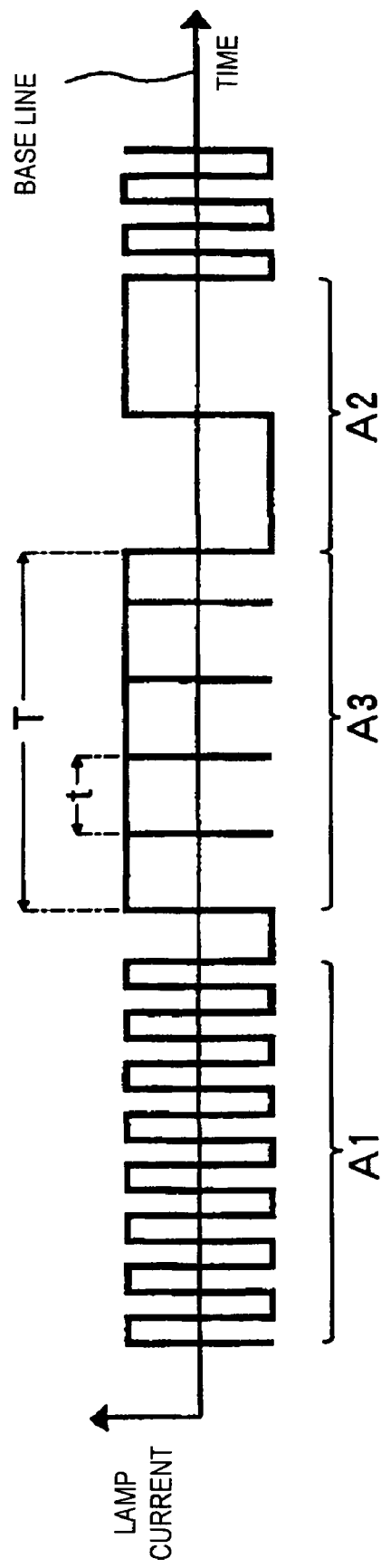
FIG. 6 is an explanatory diagram showing another example of a waveform of alternating current supplied to an ultrahigh pressure mercury lamp from a power supply apparatus.
Figure 7:
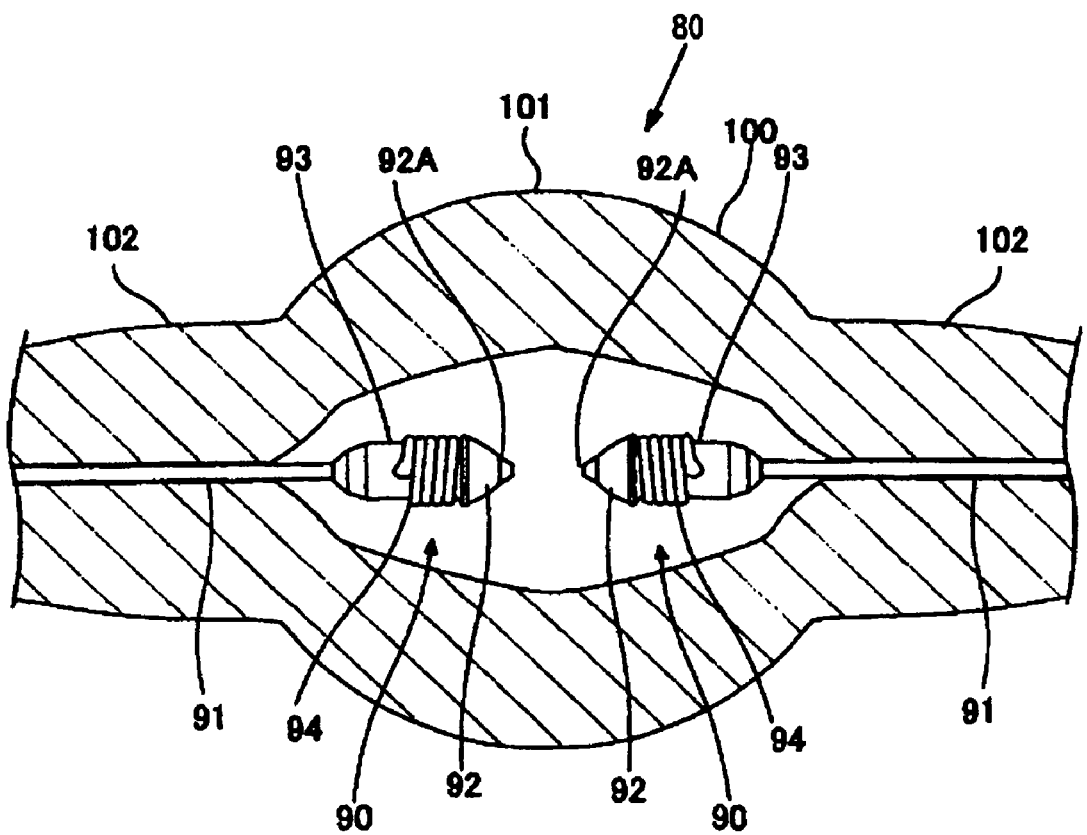
FIG. 7 is an explanatory cross sectional view of the structure of a main part of an example of a conventional ultrahigh pressure mercury lamp.

In the present invention, it is possible to make various changes to the examples described above without limiting thereto. (1) It is not indispensable to form the larger diameter portion 23B on the axis portion 23 of the electrode 20, and the axis portion 23 may have a rod shape whose diameter is constant. (2) The waveform of the alternating current supplied to the ultrahigh pressure mercury lamp 1 from the power supply apparatus may not be limited to that shown in FIG. 5. The alternating current may be, for example, that shown in FIG. 6, in which alternating current A2 and alternating current A3 are intermittently inserted in the alternating current A1 of the regular lighting frequency. In FIG. 6, a vertical axis shows a lamp current value, and a horizontal axis shows time. When the lamp current value is larger than a baseline, it is a period when one electrode is serving as an anode (while the other electrode serves as cathode). When the lamp current value is smaller than the baseline, it is a cathode operation period when the one electrode is serving as a cathode (while the other electrode serves as an anode).

In the present invention, like the alternating current shown in FIG. 6, as to the one electrode, when the cathode operation period according to the alternating current A3, which is inserted in the alternating current A1 of the regular lighting frequency, is shorter than the cathode operation period according to the alternating current A1 of regular lighting frequency, that is, when the frequency concerning the cathode operation period according to the alternating current A3 is higher than the frequency concerning the cathode operation period according to the alternating current A1, the cathode operation period according to the alternating current A3 is disregarded, and the total of the actual anode operation period according to the alternating current A3 is regarded as the one anode operation period T according to the alternating current A3.

Embodiment

According to the structure shown in FIGS. 1-4, alternating current lighting type lamps (A) through (F) were produced. Moreover, all the lamps have the same specification in material of an arc tube, a distance between electrodes, enclosed material, and the electrode. The arc tube thereof was made of silica glass, and the internal volume of a light emission section was 0.0825 cm$^3$. The distance between the electrodes was 1.1 mm. Mercury, rare gas, and bromine as the halogen were enclosed in the arc tube, wherein the enclosed amount of mercury was 0.29 mg/mm$^3$ and the enclosed amount of halogen was $3\times10^{-3}$ μmol/mm$^3$. The electrodes were made from tungsten whose purity was 5N, and other specification thereof was shown in table 1 shown below. The input electric power was 275 W.

TABLE 1

| | Axis portion | | Head portion | | | | | |
| | Diameter of small diameter portion (mm) | Diameter of large diameter portion (mm) | Diameter of back end (mm) | Full length (mm) | Cylindrical portion | | | Alternating current of low frequency (Hz) | $d/(1/f)_{1/2}$ |
| | | | | | Outer diameter (mm) | Inner diameter (mm) | Full length (mm) | | |
| Lamp (A) | 0.4 | 0.77 | 1.6 | 0.3 | 1.6 | 1.15 | 1.2 | 45 | 2.0 |
| Lamp (B) | 0.4 | 0.77 | 1.6 | 0.3 | 1.6 | 1.15 | 1.2 | 60 | 2.3 |
| Lamp (C) | 0.4 | 0.77 | 1.6 | 0.4 | 1.6 | 1.15 | 1.2 | 90 | 3.8 |
| Lamp (D) | 0.4 | 0.77 | 1.6 | 1.2 | 1.6 | 1.15 | 1.2 | 45 | 8.0 |
| Lamp (E) | 0.4 | 0.77 | 1.6 | 0.8 | 1.6 | 1.15 | 1.2 | 120 | 8.8 |
| Lamp (F) | 0.4 | 0.77 | 1.6 | 1.2 | 1.6 | 1.15 | 1.2 | 360 | 22.8 |

While alternating current whose regular lighting frequency was 370 Hz was supplied from a power supply apparatus to the lamps (A)-(F), every time the supply time of the alternating current of the regular lighting frequency reached 0.1 second, the alternating current of low frequency shown in the table 1 was supplied for a period corresponding to the respective frequency, and each lamp was continuously lighted for a maximum of 3000 hours to measure the illuminance maintenance rate. The results are shown below in table 2. Practically, an ultrahigh pressure mercury lamp could be used when an illuminance maintenance rate of 50% or more is required. Further, the lamp could be used if the required use life span of the ultrahigh pressure mercury lamp was 1500 hours or more.

TABLE 2

| | Illuminance maintenance rate Lighting time | | | | | | | |
|---|---|---|---|---|---|---|---|---|
| | 100 hours | 500 hours | 750 hours | 1000 hours | 1500 hours | 2000 hours | 2500 hours | 3000 hours |
| Lamp (A) | 70 | 61 | 50 | 34 | Not measured | | | |
| Lamp (B) | 85 | 72 | 60 | 52 | 32 | Not measured | | |
| Lamp (C) | 92 | 80 | 71 | 65 | 50 | 32 | Not measured | |
| Lamp (D) | 96 | 86 | 80 | 78 | 65 | 49 | 38 | Not measured |
| Lamp (E) | 95 | 88 | 82 | 78 | 64 | 50 | 40 | Not measured |
| Lamp (F) | 98 | 94 | 90 | 85 | 78 | 72 | 69 | 61 |

As apparent from the result shown in the table 2, the value of $d/(1/f)^{1/2}$ was 3.8 or more, even when the lamp was continuously lit for a long time, which confirms that the high illuminance maintenance rate thereof was obtained.

The preceding description has been presented only to illustrate and describe exemplary embodiments of the present ultrahigh pressure mercury lamp and ultrahigh pressure mercury lamp lighting apparatus. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. An ultrahigh pressure mercury lamp, comprising,
    an arc tube that comprises silica glass;
    a light emission section;
    sealing portions that continuously form from both ends of the light emission section,
    and a pair of electrodes,
    wherein each of the pair of electrodes has a rod shape axis portion whose base end portion is buried and held in the sealing portion,
    wherein the electrodes are arranged to face each other,
    wherein each of the pair of electrodes has a head portion whose diameter is larger than that of the axis portion and a cylindrical portion formed to project from and extend, integrally with a back end face of the head portion, such that an inner circumference face thereof is apart from the axis portion so as to surround the axis portion,
    wherein during an alternating current lighting, a relational expression of $d/(1/f)^{1/2} \geqq 3.8$ is satisfied,
    wherein frequency relating to an anode operation period which is the longest in the anode operation period during which one electrode serves as an anode, is represented as f (Hz), and
    wherein a distance in an axial direction from the leading edge position of the head portion of the electrode to a boundary position between the head portion and the cylindrical portion, is represented as d (mm).
2. An ultrahigh pressure mercury lamp according to claim 1, further comprises:
    a power supply apparatus that supplies an alternating current to the ultrahigh pressure mercury lamp,
    wherein while the power supply apparatus supplies alternating current of a regular lighting frequency, an alternating current of a frequency lower than the regular lighting frequency is inserted intermittently in the alternating current with the regular lighting frequency.

* * * * *